(12) United States Patent
Obayashi et al.

(10) Patent No.: US 9,034,116 B2
(45) Date of Patent: May 19, 2015

(54) COMPOSITE STEEL PART AND MANUFACTURING METHOD FOR THE SAME

(75) Inventors: Koji Obayashi, Toyoake (JP); Daisuke Kasai, Kata (JP); Keita Taguchi, Agi (JP); Takaaki Ogiso, Anjo (JP); Tsutomu Sato, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 430 days.

(21) Appl. No.: 13/441,464

(22) Filed: Apr. 6, 2012

(65) Prior Publication Data
US 2012/0267010 A1  Oct. 25, 2012

(30) Foreign Application Priority Data

Apr. 22, 2011 (JP) ................................ 2011-096434

(51) Int. Cl.
C23C 8/20 (2006.01)
B32B 15/00 (2006.01)
(Continued)

(52) U.S. Cl.
CPC ......... *B23K 15/0053* (2013.01); *B23K 15/0033* (2013.01); *B23K 26/285* (2013.01); *B23K 26/3206* (2013.01); *B23K 26/421* (2013.01); *B23K 2201/34* (2013.01); *B23K 2203/04* (2013.01); *C23C 8/02* (2013.01);
(Continued)

(58) Field of Classification Search
CPC ........... B23K 15/0033; B23K 26/3206; B23K 2203/04; B23K 26/421; B23K 15/0053; B23K 2201/34; C23C 8/02; C23C 8/80; C23C 8/22; C21D 1/25; C21D 2211/009; C21D 1/06; C21D 2211/008; F16H 57/08

USPC ................................... 148/211, 319
See application file for complete search history.

(56) References Cited

U.S. PATENT DOCUMENTS 7,988,796 B2  8/2011 Ohbayashi et al.
2006/0243353 A1  11/2006 Milam
(Continued)

FOREIGN PATENT DOCUMENTS

CN  101490439 A  7/2009
JP  H01-127661 A  5/1989
(Continued)

OTHER PUBLICATIONS

Jun. 26, 2012 International Search Report issued in International Patent Application No. PCT/JP2012/057845 (with translation).

*Primary Examiner* — Jessee Roe
(74) *Attorney, Agent, or Firm* — Oliff PLC

(57) ABSTRACT

A manufacturing method for a composite steel part including manufacturing a first steel part by preparing an intermediate product in which an extra portion is added, and heating the intermediate product to an austenitizing temperature in a carburizing atmosphere to form a carburized layer, cooling the intermediate product at a rate less than a cooling rate at which martensitic transformation is caused and in which the intermediate product is cooled to a temperature equal to or less than a temperature at which structure transformation due to the cooling is completed, heating the intermediate product to an austenitizing range by high-density energy and thereafter cooled at a rate equal to or more than the cooling rate at which martensitic transformation is caused to form a carburized quenched portion, cutting the extra portion of the intermediate product, and welding the first steel part and the second steel part to each other.

5 Claims, 16 Drawing Sheets

(51) Int. Cl.
  *B23K 31/02* (2006.01)
  *B23K 15/00* (2006.01)
  *B23K 26/28* (2014.01)
  *B23K 26/32* (2014.01)
  *B23K 26/30* (2014.01)
  *C23C 8/02* (2006.01)
  *C23C 8/22* (2006.01)
  *C23C 8/80* (2006.01)
  *C21D 1/06* (2006.01)
  *C21D 1/25* (2006.01)
  *F16H 57/08* (2006.01)

(52) U.S. Cl.
  CPC .. *C23C 8/22* (2013.01); *C23C 8/80* (2013.01); *F16H 57/08* (2013.01); *C21D 1/06* (2013.01); *C21D 1/25* (2013.01); *C21D 2211/002* (2013.01); *C21D 2211/008* (2013.01); *C21D 2211/009* (2013.01)

(56) References Cited

U.S. PATENT DOCUMENTS

| | | |
|---|---|---|
| 2009/0088286 A1 | 4/2009 | Fujita et al. |
| 2009/0302094 A1 | 12/2009 | Milam |

FOREIGN PATENT DOCUMENTS

| | | |
|---|---|---|
| JP | A-3-181654 | 8/1991 |
| JP | A-4-319085 | 11/1992 |
| JP | U-7-28234 | 5/1995 |
| JP | A-9-85430 | 3/1997 |
| JP | A-11-333571 | 12/1999 |
| JP | A-2002-13616 | 1/2002 |
| JP | A-2005-061451 | 3/2005 |
| JP | A-2005-076866 | 3/2005 |
| JP | A-2008-539086 | 11/2008 |
| JP | A-2009-28736 | 2/2009 |
| JP | A-2009-97716 | 5/2009 |

COMPOSITE STEEL PART AND MANUFACTURING METHOD FOR THE SAME

INCORPORATION BY REFERENCE

The disclosure of Japanese Patent Application No. 2011-096434 filed on Apr. 22, 2011 including the specification, drawings and abstract is incorporated herein by reference in its entirety.

BACKGROUND OF THE INVENTION

The present invention relates to a composite steel part including both a carburized quenched portion and a welded portion, and to a manufacturing method for the composite steel part.

DESCRIPTION OF THE RELATED ART

An outer race part and an inner race part for a one-way clutch (see Japanese Patent Application Publication No. 2005-61451 (JP 2005-61451 A)) are examples of parts to be incorporated in an automotive automatic transmission. Such race parts include a cylindrical race part including a sliding surface on its outer peripheral surface or inner peripheral surface. The race parts also include a coupling portion including a welding expected portion to be welded to another steel part. The coupling portion and the race portion are formed by a single part.

The above race portion is preferably subjected to a carburizing quenching process for enhancing the surface hardness in order to improve the wear resistance of the sliding surface. On the other hand, the above welding expected portion is preferably not subjected to the carburizing quenching process in order to avoid a reduction in weldability. To such ends, the following complicated manufacturing method is adopted in the related art.

That is, a steel material with a relatively low carbon content is used as a raw material, and is subjected to forging and cutting steps to obtain a steel part formed in a shape close to that of the final product. Then, an anti-carburizing process in which a welding expected portion of the steel part is covered with an anti-carburizing agent is performed. Then, the steel part is subjected to a carburizing process in a gas carburizing furnace, oil-quenched immediately thereafter, and thereafter subjected to a tempering process. After that, shot blasting is performed on the anti-carburized portion to remove the anti-carburizing agent. After that, a high-frequency quenching process is performed again on the above race portion which requires the highest wear resistance. Finally, a light cutting process is performed on the welding expected portion to form the welding expected portion into the final shape.

A general method for the anti-carburizing process etc. is described in Japanese Patent Application Publication No. 2005-76866 (JP 2005-76866 A), for example.

SUMMARY OF THE INVENTION

In the manufacturing method according to the related art for a composite steel part formed by welding a first steel part formed by the above race part to at least a second steel part, as discussed above, it is necessary to perform the carburizing process after performing the anti-carburizing process in which the anti-carburizing agent is applied to the welding expected portion, and to thereafter perform the light cutting process for a finish after the anti-carburizing agent removal process. Among such processes, the anti-carburizing process and the anti-carburizing agent removal process involve a significantly large number of man-hours to result in a cost increase. If the anti-carburizing process is simply omitted, on the other hand, the amount of carbon in the raw material of the welding expected portion may be increased to disadvantageously cause a weld crack during welding. Thus, the anti-carburizing process may not be simply omitted.

The hardness of the sliding surface of the above race portion may not be sufficiently enhanced by only the oil quenching process performed immediately after the carburizing process in the related art. Therefore, high-frequency quenching in which water quenching is performed after high-frequency heating is performed again to enhance the hardness improving effect. Such double quenching processes are not preferred in terms of energy conservation. Meanwhile, it is conceivable to replace the quenching performed immediately after the carburizing process with a method that uses a medium with a high cooling capability such as water, rather than oil, in order to improve the quenching efficiency, and to omit the subsequent high-frequency quenching. In this case, however, significant quenching distortion may be caused in the entire race part, which may require an additional step of correcting such distortion or the like.

Further, it is also conceivable to use a steel material with a relatively high carbon content in order to completely dispense with the carburizing process and perform only the final high-frequency quenching. However, it is difficult to significantly increase the carbon content from the viewpoint of workability, and the carbon concentration on the surface may not be made so high as in the case where carburization is performed. Therefore, the hardness improving effect of the quenching is low, and desired wear resistance may not be obtained.

The present invention has been made against such background, and has an object to provide a manufacturing method for a composite steel part that can achieve a sufficient effect of improving the surface hardness of a part that requires wear resistance, that can improve the characteristics of a welded portion more than ever, and that can completely abolish an anti-carburizing process during manufacture.

A first aspect of the present invention provides a manufacturing method for a composite steel part formed by welding a plurality of steel parts to each other, which includes: manufacturing a first steel part, which includes a carburized quenched portion which has been subjected to a carburizing quenching hardening process and a welding expected portion to be welded to at least a second steel part, by preparing an intermediate product in which an extra portion, which has a thickness equal to or more than that of a carburized layer to be formed in a subsequent carburizing step, has been added to the welding expected portion, and performing the carburizing step in which the intermediate product is heated to an austenitizing temperature or more in a carburizing atmosphere to form the carburized layer on a surface of the intermediate product, a cooling step, subsequent to the carburizing step, in which the intermediate product is cooled at a cooling rate less than a cooling rate at which martensitic transformation is caused and in which the intermediate product is cooled to a temperature equal to or less than a temperature at which structure transformation due to the cooling is completed, a quenching step in which a desired portion of the intermediate product is heated to an austenitizing range by high-density energy and thereafter cooled at a cooling rate equal to or more than the cooling rate at which martensitic transformation is caused to form the carburized quenched portion in the desired portion, and a cutting step in which the extra portion of the intermediate product is cut; and then performing a welding step in which at least the second steel part is brought into abutment with the welding expected portion of the obtained first steel part to weld the first steel part and the second steel part to each other.

A second aspect of the present invention provides a composite steel part formed by welding a plurality of steel parts to each other, wherein: a first steel part includes a race portion formed in a cylindrical shape and including a sliding surface on an outer peripheral surface or inner peripheral surface of the race portion, and a coupling portion provided to extend from the race portion to be coupled to at least a second steel part; the race portion is formed by a carburized quenched portion in which a surface layer portion has a martensite structure and an inner portion has a bainite structure; the coupling portion includes a welded portion welded to at least the second steel part; the welded portion includes a melt/resolidificated portion and a heat-affected portion provided adjacent to the melt/resolidificated portion; and the melt/resolidificated portion has a martensite-bainite-pearlite structure, and the heat-affected portion has a bainite-ferrite-pearlite structure.

In the manufacturing method according to the above first aspect, in order to manufacture the first steel part, the carburizing step and the cooling step described above are performed using the intermediate product including the above extra portion. After that, the above quenching step is performed locally on the portion which is to become the carburized quenched portion, and the cutting step is performed to remove the above extra portion. The order of the quenching step and the cutting step may be reversed.

By adopting such manufacturing steps, it is possible to eliminate the need to perform the quenching process on the above welding expected portion, and to remove a portion of the welding expected portion with a carbon concentration increased through the carburizing step together with the above extra portion in the above cutting step. Therefore, it is possible to completely omit an anti-carburizing process and an anti-carburizing agent removal process which are performed in the related art to provide the welding expected portion, and to reduce the number of man-hours and the amount of energy used for such processes.

By locally performing the above quenching step which uses high-density energy, it is possible to obtain the above carburized quenched portion which has excellent wear resistance and high hardness on the surface and which has excellent toughness in the inner portion while suppressing generation of distortion.

By performing the above cooling step, in which the intermediate product is not cooled rapidly but cooled at a restricted cooling rate, after the above carburizing step, it is possible to suppress cooling distortion in the overall shape of the above first steel part, and to maintain good dimensional accuracy.

Thus, according to the above manufacturing method, in obtaining the above first steel part, it is possible to achieve a sufficient effect of improving the surface hardness of the part that requires wear resistance, to improve the weldability of the welding expected portion more than ever, and to completely abolish the anti-carburizing process during manufacture.

In the subsequent welding step, as described above, welding is performed at the welding expected portion with good weldability. Therefore, a composite steel part with excellent welding strength can be obtained.

The composite steel part according to the above second aspect can be easily manufactured by applying the above manufacturing method, for example. The race portion formed by the carburized quenched portion having the above specific structure demonstrates excellent wear resistance, and the welded portion having the above specific structure provides excellent characteristics.

DETAILED DESCRIPTION OF THE EMBODIMENTS

Figure 1:
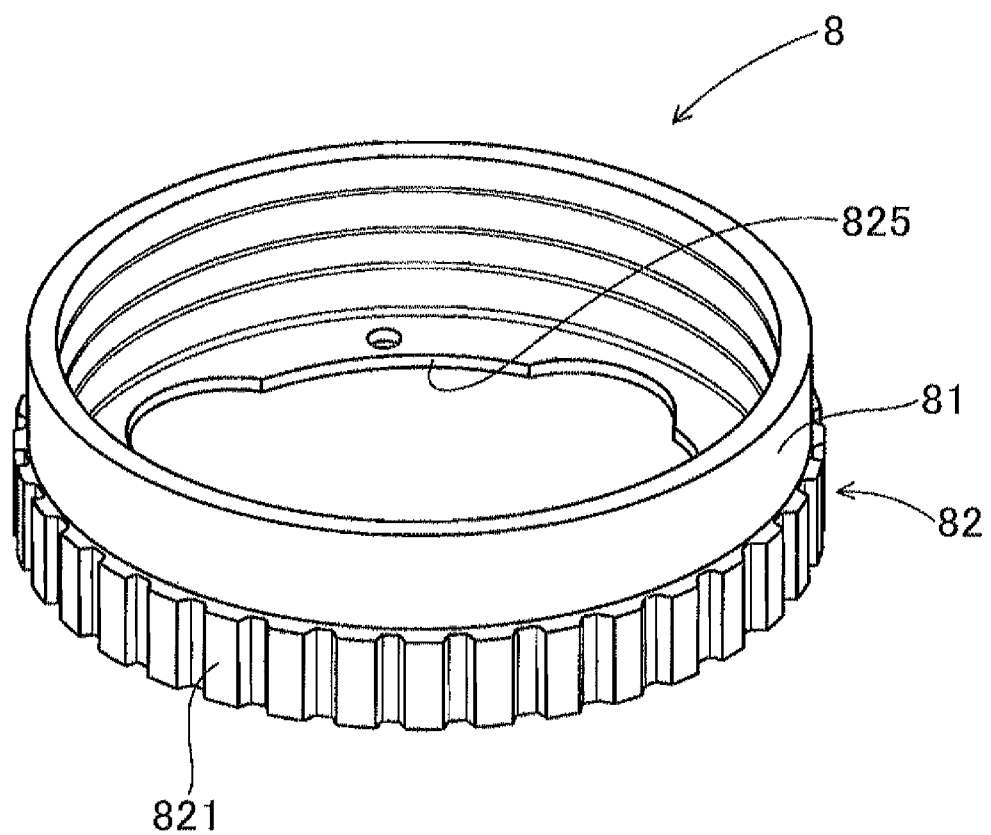
FIG. 1 is a perspective view of a first steel part according to a first embodiment.

In the manufacturing method for the above composite steel part, the above carburizing step is preferably performed in a low-oxygen carburizing atmosphere in which the oxygen concentration is lower than that in the atmosphere. Specifically, the method may be performed in a decompressed carburizing gas, the pressure of which has been reduced to be lower than the atmospheric pressure, for example. That is, it is effective to adopt a decompressed carburizing step. In the decompressed carburizing step, the carburizing process can be performed using a relatively small amount of the carburizing gas while maintaining the inside of a carburizing furnace at a high temperature in a decompressed state. Thus, the carburizing process can be performed more efficiently than in the related art. In addition, a heating process performed in the related art over a long time using a large heat treatment furnace is no longer necessary. Thus, it is possible to reduce processing time, energy consumption, and further the size of the carburizing/quenching apparatus itself.

By adopting the decompressed carburization, it is possible to reduce the pressure of the carburizing atmosphere in the carburizing step compared to the atmospheric pressure, which suppresses the amount of oxygen in the atmosphere to be low. This prevents intergranular oxidation of the carburized layer.

The method for carburization performed in a carburizing atmosphere, the oxygen concentration of which is lower than the atmosphere, is not limited to the decompressed carburization described above. For example, a nitrogen gas or an inert gas may be charged, rather than reducing the pressure of the atmosphere, to suppress the amount of oxygen in the atmosphere to be low to prevent intergranular oxidation of the carburized layer.

The above decompressed carburization is also referred to as vacuum carburization, and is a carburizing process performed with the pressure of the atmosphere in the furnace reduced and with a hydrocarbon gas (such as methane, propane, ethylene, and acetylene, for example) directly introduced into the furnace as the carburizing gas. In general, a decompressed carburizing process includes a carburizing period in which activated carbon generated as a carburizing gas contacts a surface of steel to be decomposed becomes a carbide on the surface of the steel to be accumulated in the steel, and a diffusion period in which the carbide is decomposed so that the accumulated carbon is dissolved in a matrix to be diffused inward. It is said that the carbon is not only supplied by way of the carbide, but also directly dissolved in the matrix.

In addition, the above carburizing step is preferably performed under a decompression condition at 1 to 100 hPa. In the case where the pressure during the carburization in the decompressed carburizing step is reduced to be less than 1 hPa, an expensive apparatus may be required to maintain the degree of vacuum. In the case where the pressure exceeds 100 hPa, on the other hand, soot may be generated during the carburization to cause unevenness in carburization concentration.

As the above carburizing gas, hydrocarbon gases such as acetylene, propane, butane, methane, ethylene, and ethane, for example, may be used.

Examples of the above high-density energy used as a heat source in the above quenching step include a high-density energy beam such as an electron beam and a laser beam and non-beam high-density energy such as high-frequency heating. Utilizing high-density energy enables short-time heating and local heating.

As the steel raw material for the above composite steel part, low-carbon steel or low-carbon alloy steel with a carbon content equal to or less than about 0.3% by mass is preferably used. In particular, use of low-carbon steel with little added alloy elements is preferred in terms of cost and reducing the amount of consumption of rare elements. Also when such low-carbon steel is used as a raw material, a composite steel part with excellent characteristics as described above can be obtained by adopting the above manufacturing method.

The above composite steel part includes a race portion formed in a cylindrical shape and including a sliding surface on its outer peripheral surface or inner peripheral surface, and a coupling portion provided to extend from the race portion to be coupled to at least a second steel part. The above race portion is formed by the above carburized quenched portion, and the above coupling portion is provided with the above welding expected portion.

Further, the above coupling portion includes a splined portion provided to extend from the above race portion, and the above welding expected portion provided to extend from the splined portion. The above splined portion may be not subjected to the above quenching step. In this case, the above splined portion may have a ferrite-pearlite structure.

Embodiment

First Embodiment

The composite steel part and the manufacturing method for the composite steel part according to an embodiment will be described with reference to the drawings.

Figure 2:
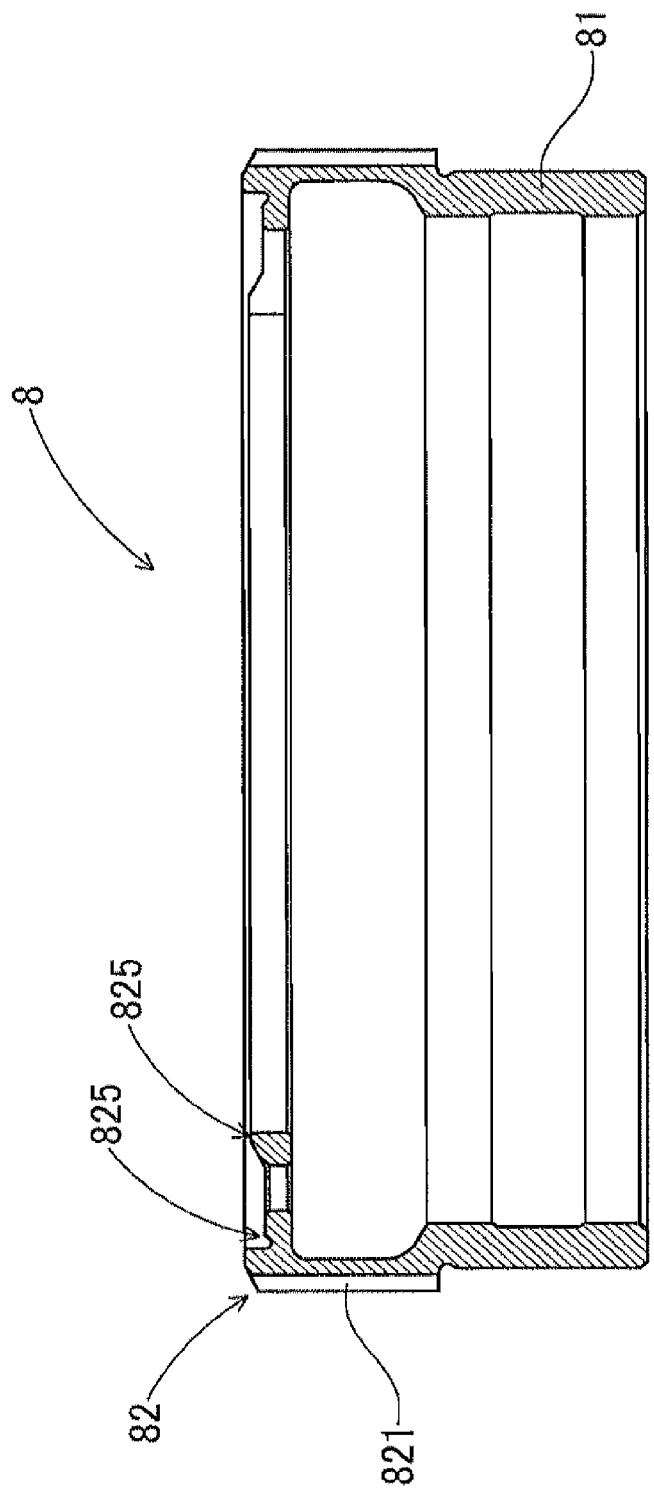
FIG. 2 is a cross-sectional view of the first steel part according to the first embodiment.

As shown in FIGS. 1 and 2, a first steel part 8 manufactured in the embodiment is an inner race part for a one-way clutch, which is a steel part to be incorporated in an automotive automatic transmission. The first steel part 8 includes a race portion 81 formed in a cylindrical shape and including a sliding surface on its outer peripheral surface, and a coupling portion 82 provided to extend from the race portion 81 to be coupled to another steel part.

The coupling portion 82 of the first steel part 8 includes a splined portion 821 provided to extend from the race portion 81, and a welding expected portion 825 provided to extend radially inward from the splined portion 821. Strictly, the welding expected portion 825 is divided into two sections, which are to be welded to second and third steel parts 71 and 72, respectively. The race portion 81 is a carburized quenched portion which has been subjected to a carburizing quenching hardening process.

Figure 3:
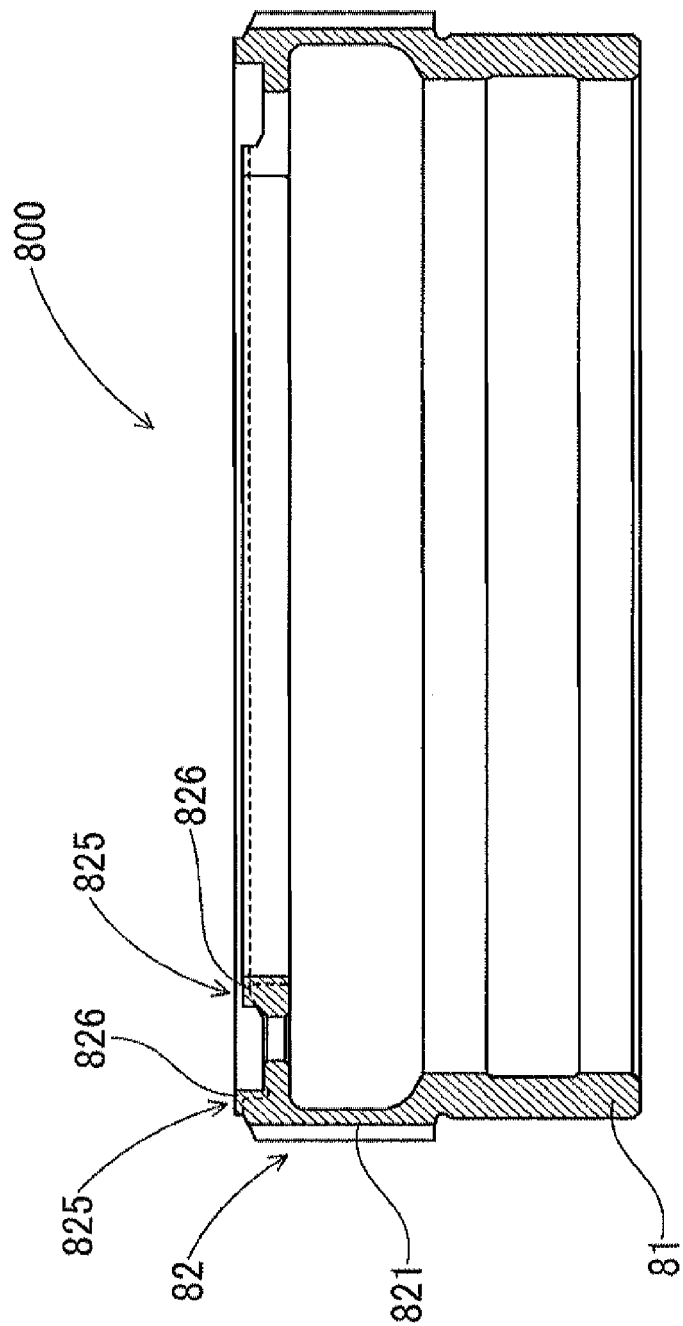
FIG. 3 is a cross-sectional view of an intermediate member according to the first embodiment.
Figure 4:
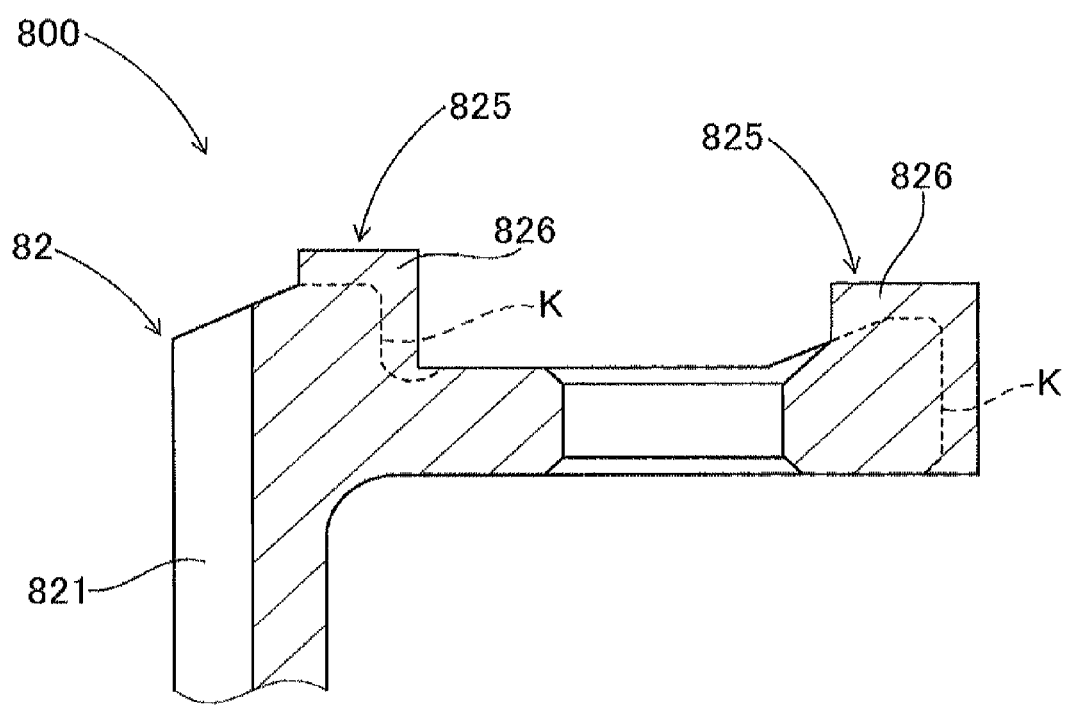
FIG. 4 is an enlarged cross-sectional view showing the vicinity of a welding expected portion of the intermediate member according to the first embodiment.

In order to manufacture such a first steel part 8, first, as shown in FIGS. 3 and 4, an intermediate product 800 is prepared through a hot forging step and a cutting step using low-carbon steel with a carbon content of 0.15% by mass as a raw material. In the intermediate product 800, the welding expected portion 825 is shaped by adding an extra portion 826 with a thickness equal to or more than that of a carburized layer to be formed in a subsequent carburizing step to a final desired shape indicated by the broken line K.

Next, a carburizing step, in which the intermediate product 800 is heated to an austenitizing temperature or more in a carburizing atmosphere to form a carburized layer on a surface of the intermediate product 800, is performed.

Next, subsequent to the carburizing step, a cooling step, in which the intermediate product 800 is cooled at a cooling rate less than a cooling rate at which martensitic transformation is caused and in which the intermediate product 800 is cooled to a temperature equal to or less than a temperature at which structure transformation due to the cooling is completed, is performed.

Next, a quenching step, in which the entire race portion 81 which is to become the carburized quenched portion of the intermediate product 800 is heated to an austenitizing range by high-density energy and thereafter cooled at a cooling rate equal to or more than the cooling rate at which martensitic transformation is caused, is performed.

After that, a cutting step, in which the welding expected portion 825 of the intermediate product 800 is cut into a final desired shape, is performed. The cutting step and the quenching step described above may be reversed in order.

Further description follows.

First, a heat treatment apparatus 5 that performs the carburizing to quenching steps on the above intermediate product 800, specific heat treatment conditions, and so forth will be briefly described.

Figure 13:
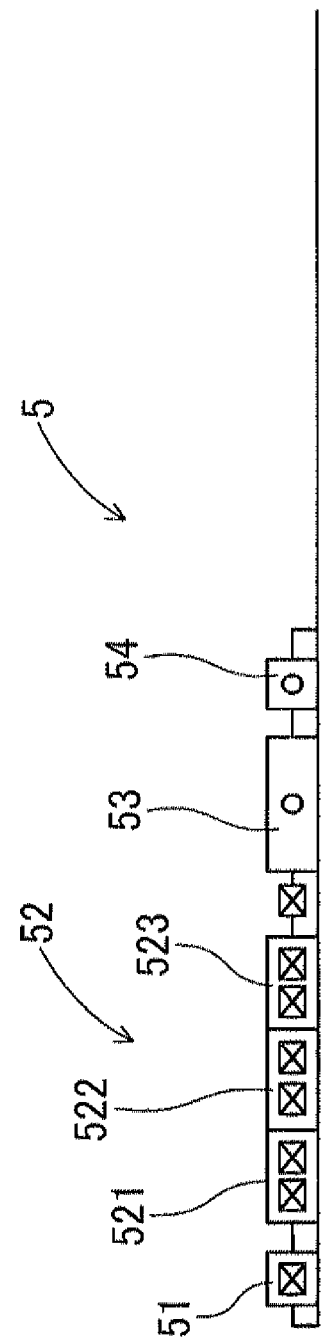
FIG. 13 is an illustration showing the configuration of a heat treatment apparatus according to the first embodiment.

As shown in FIG. 13, the heat treatment apparatus 5 includes a pre-wash bath 51 for washing the steel part before the carburizing quenching process, a decompressed carburizing/slow-cooling device 52 including a heating chamber 521, a decompressed carburizing chamber 522, and a decompressed slow-cooling chamber 523, a high-frequency quenching machine 53, and a magnetic flaw detection device 54 for inspection for a defect.

Figure 14:
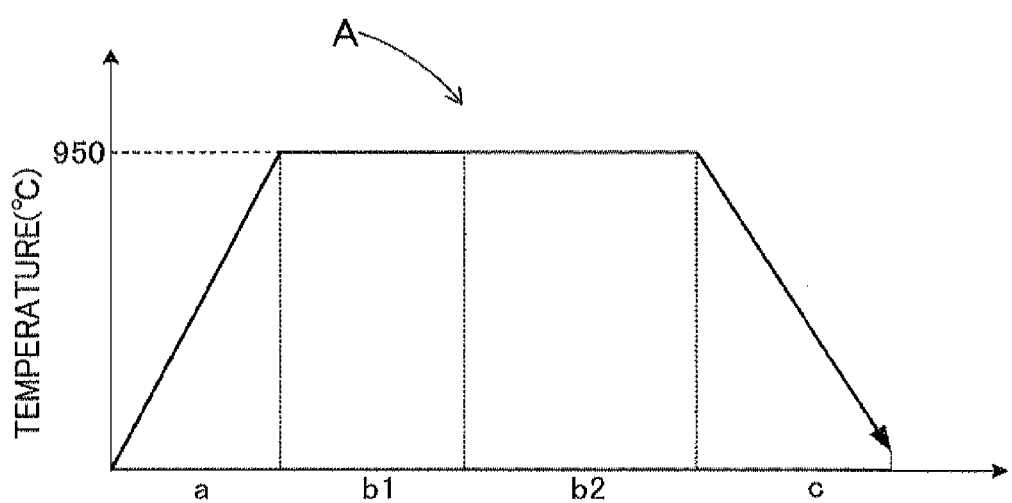
FIG. 14 is an illustration showing a heat pattern for the carburizing step and a cooling step according to the first embodiment.

The carburizing step according to the embodiment performed using the heat treatment apparatus 5 is a decompressed carburizing step performed in a decompressed carburizing gas, the pressure of which has been reduced to be lower than the atmospheric pressure. FIG. 14 shows a heat pattern A for use in the step. In the drawing, the horizontal axis and the vertical axis represent the time and the temperature, respectively.

As seen from the drawing, in the heat pattern A for the carburizing step, the temperature is raised to a carburizing temperature in a heating period a, and then kept constant in holding periods b1 and b2. The temperature is kept constant at 950° C., which is a temperature equal to or more than the austenitizing temperature. The first one, b1, of the holding periods corresponds to the carburizing period of the carburizing process, and the second one, b2, of the holding periods corresponds to the diffusion period of the carburizing process. The decompression condition for the decompressed carburizing process is defined as 1 to 3.5 hPa, and acetylene is used as the carburizing gas in the period b1 corresponding to the above carburizing period.

After the diffusion period of the decompressed carburizing process is ended, a cooling period c corresponding to the cooling step is entered. In the embodiment, a decompressed slow-cooling step is adopted, and the decompression condition for the decompressed slow-cooling step is defined as 600 hPa. Nitrogen ($N_2$) is used as a cooling atmosphere gas. The cooling rate for the decompressed slow-cooling step is set in the range of 0.1 to 3.0° C./second during a period over which the temperature is reduced from the temperature that is equal to or more than the austenitizing temperature immediately after the carburizing process to a temperature of 150° C. which is lower than an A1 transformation point. The heat pattern A and other conditions described here are merely illustrative, and may be changed to conditions optimum for the steel part to be processed through a preliminary test or the like as appropriate.

Figure 15:
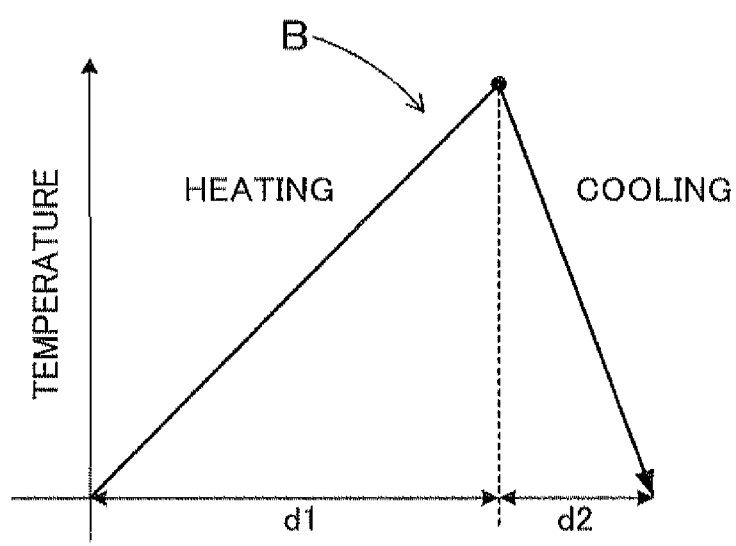
FIG. 15 is an illustration showing a heat pattern for the quenching step according to the first embodiment.

In the quenching step according to the embodiment performed after the cooling step, high-frequency heating is used as heating means, and water cooling is used as rapid-cooling means. A heat pattern B for the quenching step is shown in FIG. 15. In the drawing, the horizontal axis and the vertical axis represent the time and the temperature, respectively. As shown in the drawing, the quenching step according to the embodiment includes a heating period d1 in which the entire race portion 81 is heated through high-frequency heating to a temperature equal to or more than the austenitizing temperature, and a subsequent rapid-cooling period d2 in which the race portion 81 is water-quenched by injection of water or cooling water containing an anti-quenching crack agent so that a cooling rate equal to or more than a rapid-cooling critical cooling rate at which martensitic transformation is caused in the carburized layer can be easily obtained. The heat pattern B may be changed to a condition optimum for the steel part to be processed through a preliminary test or the like as appropriate.

Next, changes in state of structure of various portions of the intermediate product 800 and the first steel part 8 over the above steps will be described.

First, in the intermediate product 800, as shown in FIGS. 3 and 4, the welding expected portion 825 is shaped with the extra portion 826 added. The internal structure of the intermediate product 800 before the above carburizing step is a state of structure after plastic forming, as with that of a normal steel part after hot forging. When the above carburizing step is performed, the entire intermediate product 800 is transformed into an austenite structure. At this time, a surface layer portion of the intermediate product 800 has been transformed into a carburized layer 88 (see FIG. 5) with a high carbon concentration in which the carbon concentration is higher than that of the base material.

Figure 5:
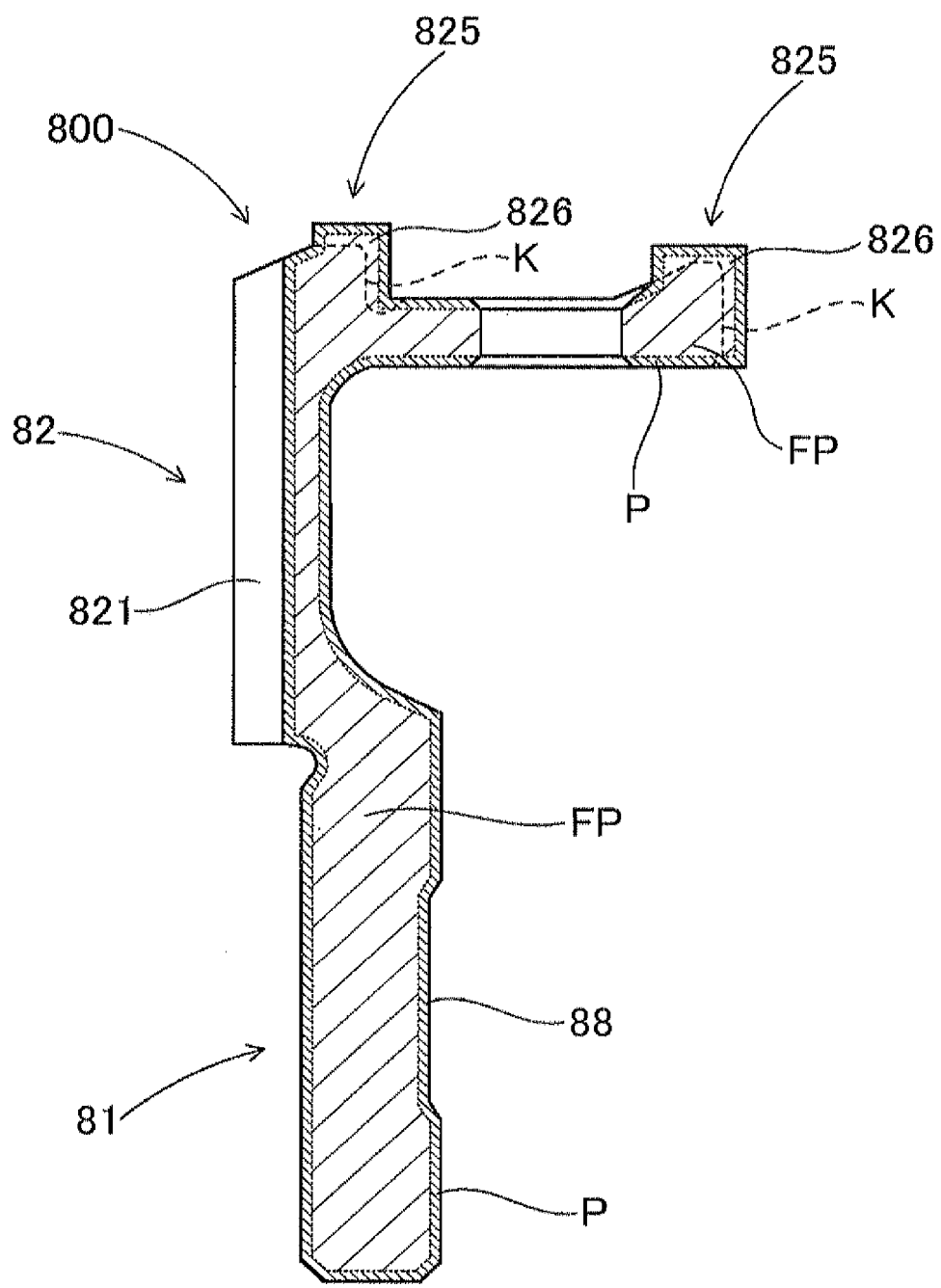
FIG. 5 is an illustration showing the state of structure immediately after a carburizing step according to the first embodiment.

Then, as shown in FIG. 5, the intermediate product 800 with the austenite structure is subjected to the subsequent decompressed slow-cooling step so that a portion of the intermediate product 800 other than the carburized layer 88 is transformed into a ferrite-pearlite structure FP and the carburized layer 88 forming the surface layer is transformed into a pearlite structure P.

Figure 6:
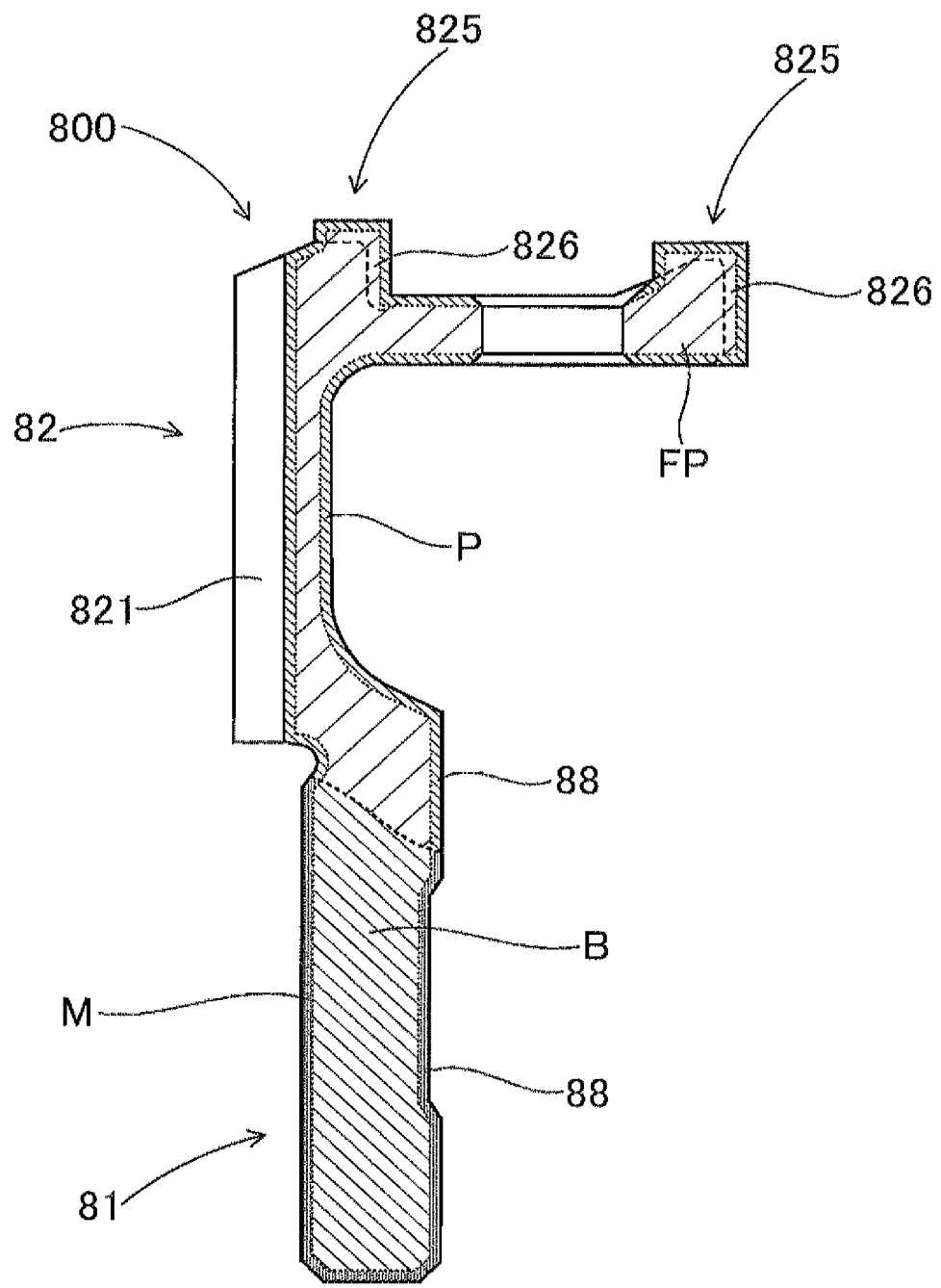
FIG. 6 is an illustration showing the state of structure immediately after a quenching step according to the first embodiment.

Next, the race portion 81 of the intermediate product 800 is locally heated through high-frequency heating in the quenching step to be transformed into an austenite structure. When water cooling is performed thereafter, as shown in FIG. 6, the carburized layer 88 is transformed into a martensite structure M, and an inner portion of the race portion 81 is transformed into a bainite structure B. In the coupling portion 82 which is not subjected to the quenching step, on the other hand, the carburized layer 88 forming the surface layer is maintained in the pearlite structure P, and an inner portion of the coupling portion is maintained in the ferrite-pearlite structure FP.

Figure 7:
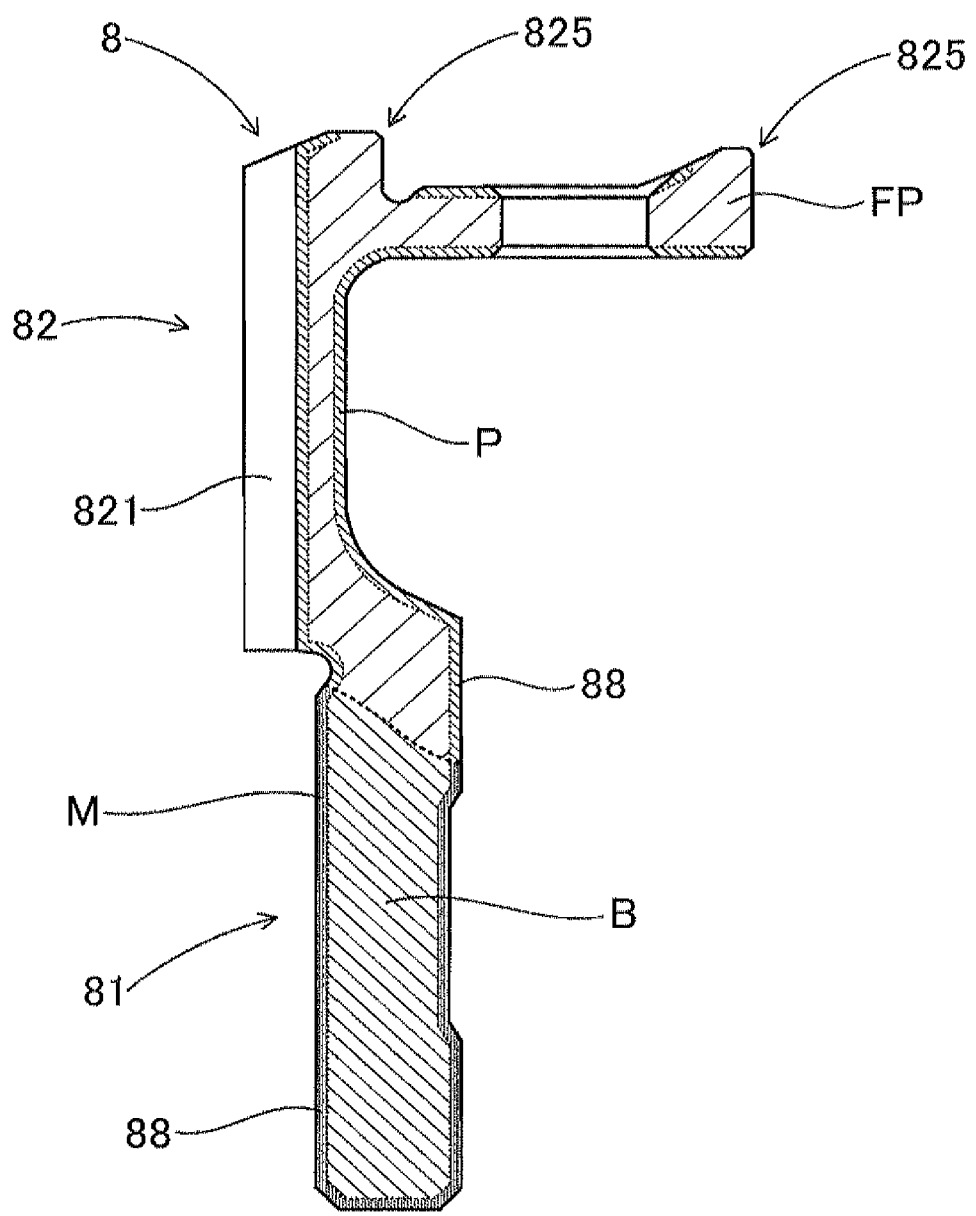
FIG. 7 is an illustration showing the state of structure after a cutting step according to the first embodiment.

After that, as shown in FIG. 7, the welding expected portion 825 of the coupling portion 82 of the intermediate product 800 is subjected to the cutting step to remove the extra portion 826 including the carburized layer 88. This results in the first steel part 8. The ferrite-pearlite structure FP is exposed in the welding expected portion 825 of the steel part 8.

Figure 8:
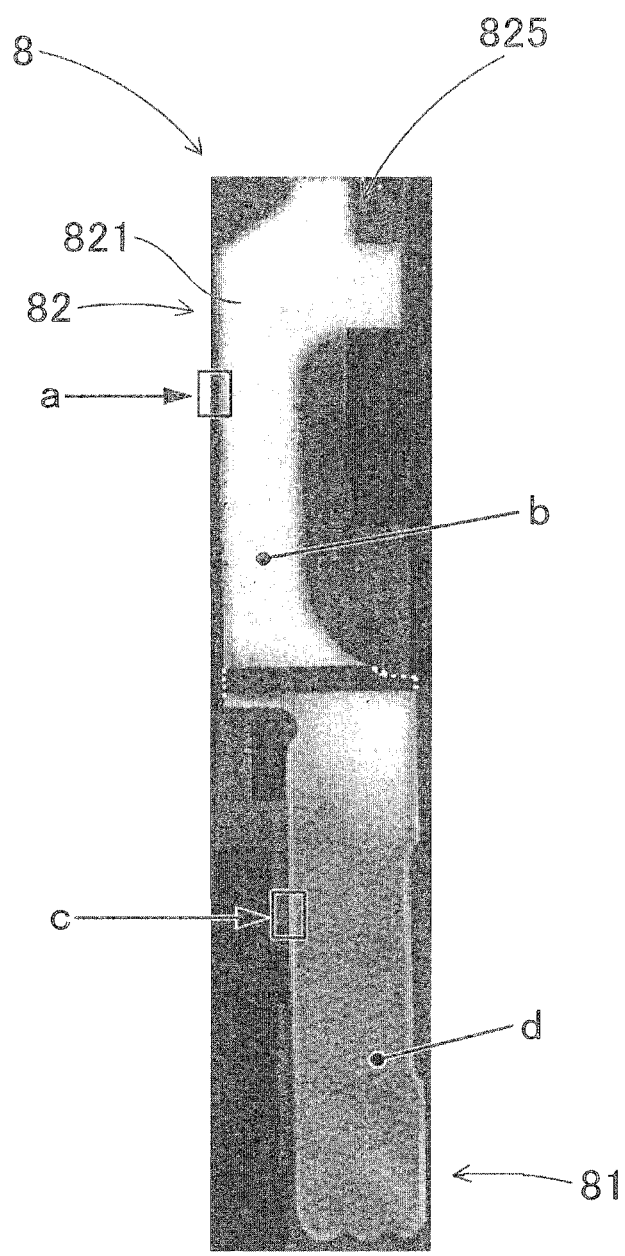
FIG. 8 is a photograph of a cross section of the first steel part according to the first embodiment.
Figure 9:
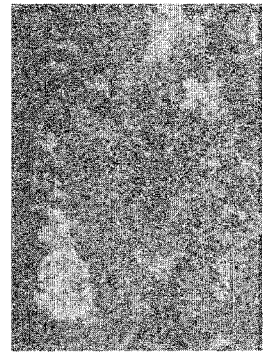
FIG. 9 is a photograph, as a substitute for a drawing of the metal structure of a portion a in FIG. 8.
Figure 10:
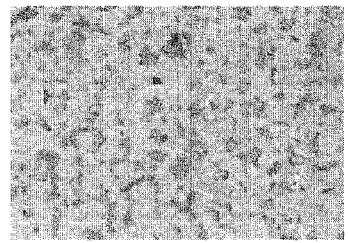
FIG. 10 is a photograph, as a substitute for a drawing of the metal structure of a portion b in FIG. 8.
Figure 11:
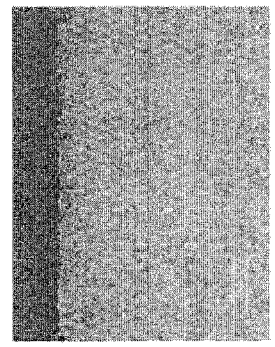
FIG. 11 is a photograph, as a substitute for a drawing of the metal structure of a portion c in FIG. 8.
Figure 12:
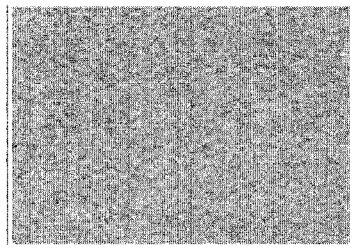
FIG. 12 is a photograph, as a substitute for a drawing of the metal structure of a portion d in FIG. 8.

FIG. 8 shows a photograph of a cross section of the obtained first steel part 8, and FIGS. 9 to 12 show photographs showing the metal structure of various portions of the first steel part 8. Differences in macrostructure are indicated by the difference in brightness in the photograph of the cross section of the steel part 8 in FIG. 8. The photograph in FIG. 9 of a metal structure shows that the carburized layer 88 forming the surface layer of the coupling portion 82 (a portion a in FIG. 8) which is not subjected to the quenching step has a pearlite structure P. The photograph in FIG. 10 of a metal structure shows that the inner portion of the coupling portion 82 (a portion b in FIG. 8) which is not subjected to the quenching step and the welding expected portion 825 have a ferrite-pearlite structure FP. The photograph in FIG. 11 of a metal structure shows that the carburized layer 88 forming the surface layer of the race portion 81 (a portion e in FIG. 8) which is a carburized quenched portion which has been subjected to the quenching step has a martensite structure M. The photograph in FIG. 12 of a metal structure shows that the inner portion of the race portion 81 (a portion d in FIG. 8) which is a carburized quenched portion which has been subjected to the quenching step has a bainite structure B.

In order to improve the product quality, it is effective to perform a polishing process, a grinding process, or the like before or after the cutting step to further improve the overall dimensional accuracy and perform washing at the end.

Figure 16:
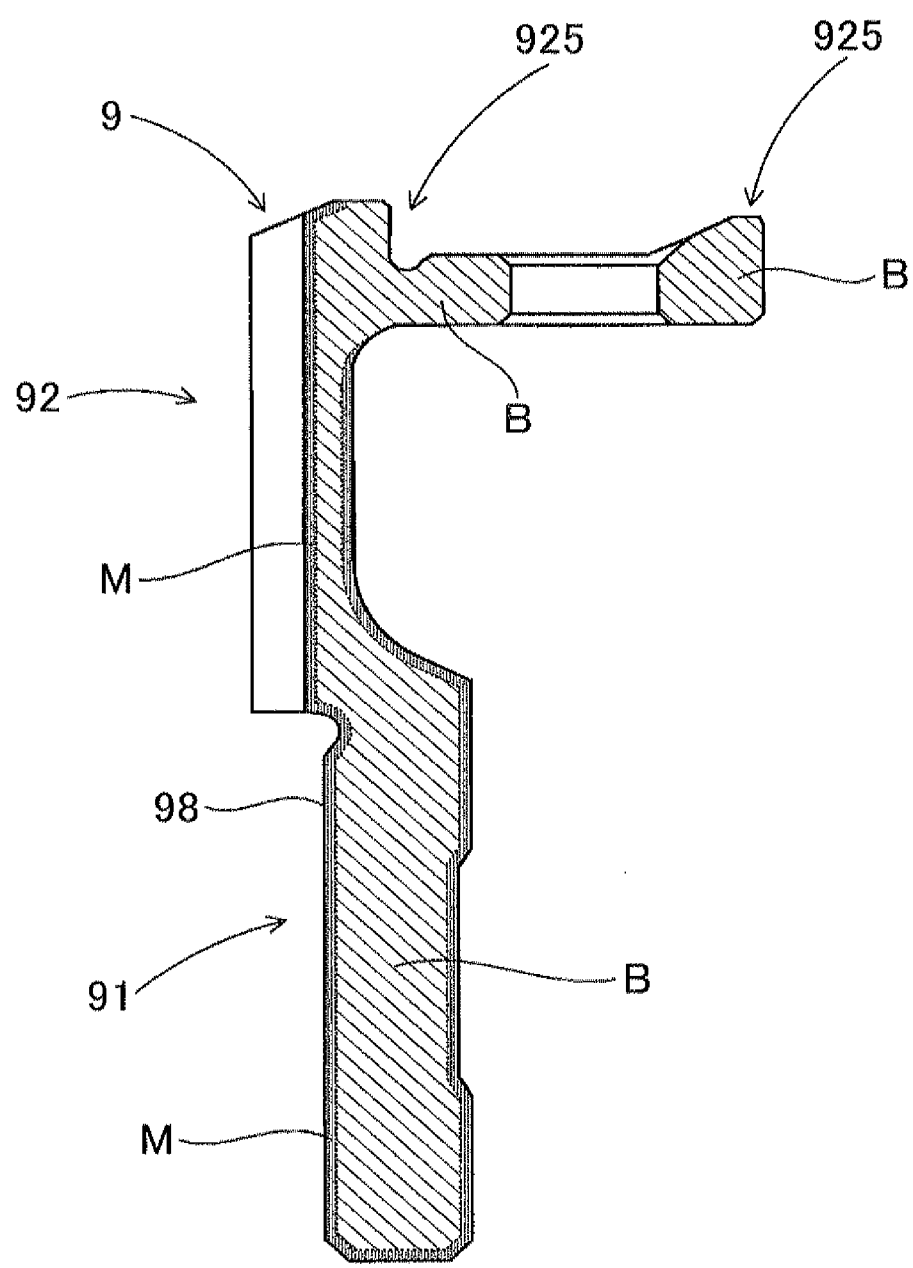
FIG. 16 is an illustration showing the state of structure of a comparative part.

Next, the hardness characteristics and the weldability of various portions of the obtained first steel part 8 were evaluated. For comparison, a comparative part 9 obtained by the manufacturing method according to the related art was prepared, In the comparative part 9, an anti-carburizing process in which a surface of a portion of a coupling portion 92 including a welding expected portion 925 is covered with an anti-carburizing agent is performed, and thereafter a carburizing quenching process is performed. After that, shot blasting is performed to remove the anti-carburizing agent, and further a finishing process such as polishing is performed. In the comparative part 9, as shown in FIG. 16, a surface layer of a race portion 91 which is not subjected to the anti-carburizing process is a carburized layer 98 having a martensite structure, and an inner portion of the race portion 91 and the entire coupling portion 92 have a bainite structure.

The hardnesses of various portions of the steel part 8 and the comparative part 9 were measured in cross section.

The martensite structure M in the carburized layer 88 (FIG. 7) of the race portion 81 of the steel part 8 had a Vickers hardness in the range of 768 to 801 HV, and was found to be significantly hard. The bainite structure B in the inner portion of the race portion 81 of the steel part 8 had a Vickers hardness in the range of 317 to 452 HV, and was found to have moderate hardness and also excellent toughness. Further, the ferrite-pearlite structure FP in the coupling portion 82 of the first steel part 8 including the welding expected portion 825 had a Vickers hardness in the range of 154 to 168 HV, and had relatively low hardness. On the other hand, the pearlite structure P in the carburized layer 88 forming the surface layer of the coupling portion 82 had slightly higher hardness, and had a Vickers hardness in the range of 265 to 283 HV.

In the comparative part 9, in contrast, the martensite structure M in the carburized layer 98 (FIG. 16) of the race portion 91 had a Vickers hardness in the range of 768 to 796 HV, and had significantly high hardness. The bainite structure B in the inner portion of the race portion 91 and in the entire coupling portion 92 of the comparative part 9 had a Vickers hardness in the range of 298 to 448 HV.

Through comparison between the comparative part 9 fabricated by the manufacturing method according to the related art and the steel part 8 according to the embodiment, it was found that the race portion 81 of the steel part 8 had a surface hardness comparable to that of the comparative part 9 and maintained significantly excellent wear resistance characteristics.

In the first steel part 8 according to the embodiment, the carburized layer 88 forming the surface layer of the splined portion 821, which is a part of the above coupling portion 82, has a pearlite structure P, and the inner portion of the splined portion 821 has a ferrite-pearlite structure FP. In the comparative part 9, on the other hand, the carburized layer 98 forming the surface layer of a splined portion 921 has a martensite structure M, and the inner portion of the splined portion 921 has a bainite structure B, as with the race portion 91. Such differences lead to a difference in hardness characteristics etc. between the splined portion 821 and the splined portion 921, and the steel part 8 is lower than the comparative part 9 in at least surface hardness. For an inner race part for a one-way clutch which is the steel part 8 according to the embodiment, it was revealed to be preferable, in terms of vibration and other various performance, that the carburized layer 88 forming the surface layer should have a pearlite structure P and the inner portion should have a ferrite-pearlite structure FP to provide low hardness compared to the related art as described above in consideration of the state of engagement with the second and third steel parts 71 and 72. The splined portion 821 may be subjected to a quenching treatment step to be a carburized quenched portion as with the above race portion 81 as necessary.

Figure 17:
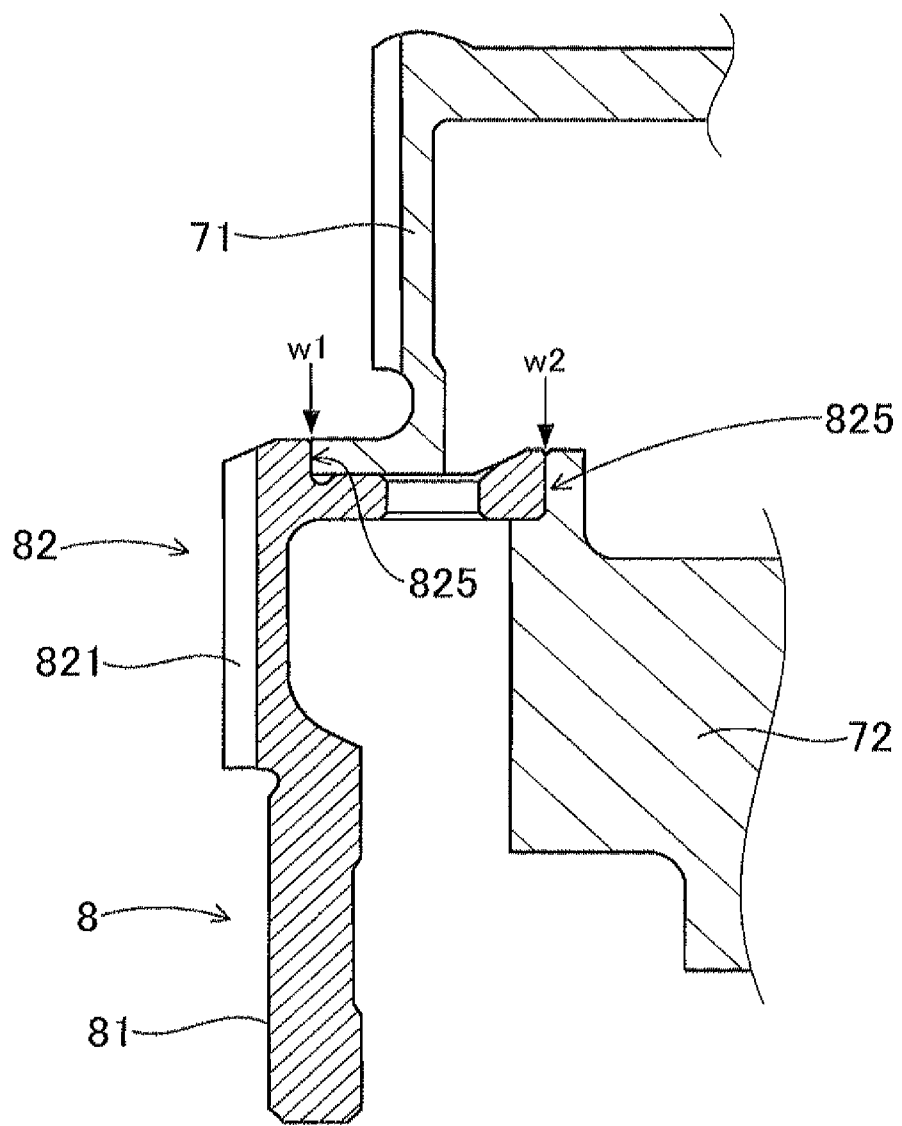
FIG. 17 is an illustration showing a position at which the first steel part and second and third steel parts are welded to each other according to the first embodiment.

Next, the weldability of the steel part 8 and the comparative part 9 was evaluated. Specifically, as shown in FIG. 17, the second and third steel parts 71 and 72 to be welded to the welding expected portion 825 were prepared, and actually electron-beam-welded to locations for welding W1 and W2. Then, a torsion test was performed on the welded portion.

As a result of the test, it was found that the weldability of the steel part 8 was equal to or more than that of the comparative part 9.

Figure 18:
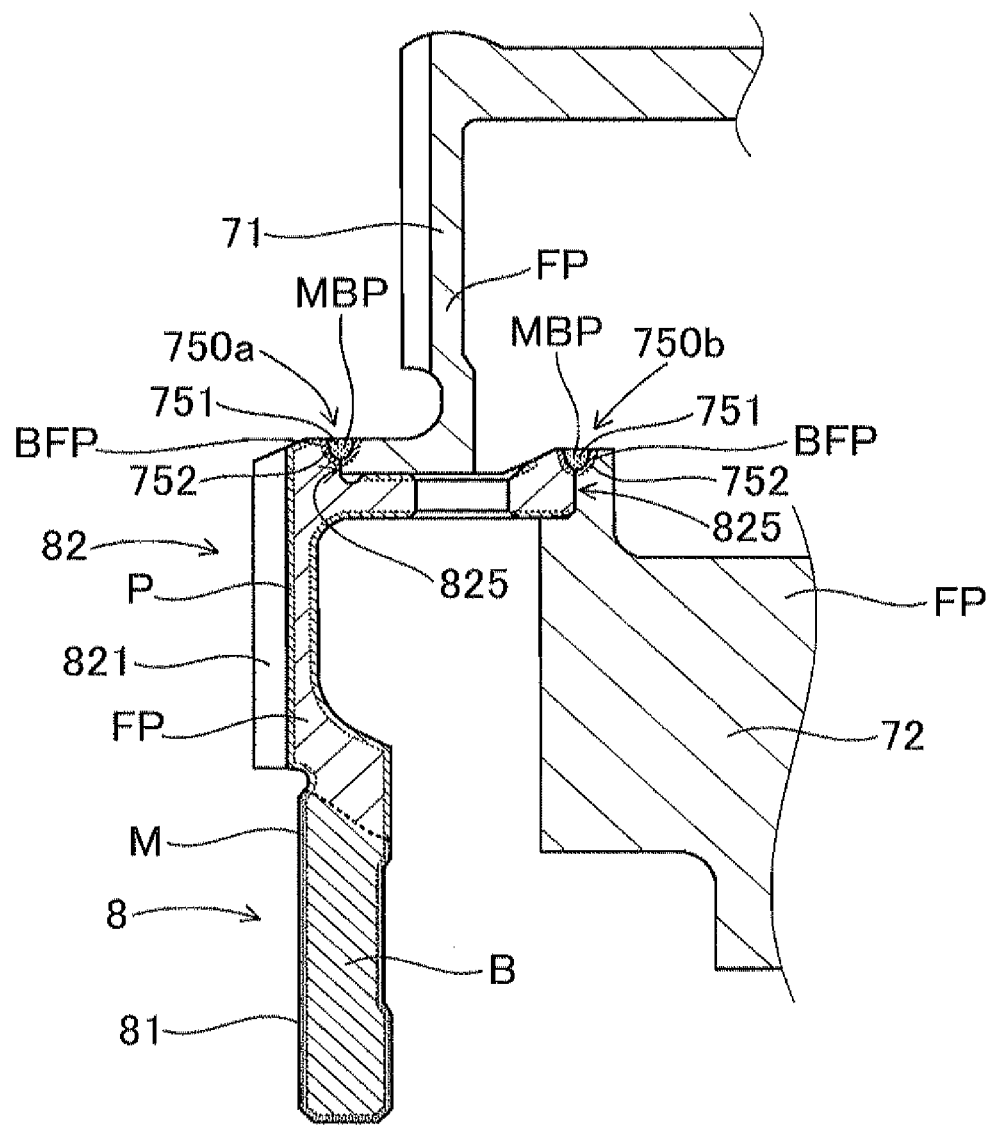
FIG. 18 is an illustration showing the state of structure of a welded portion between the first steel part and the second and third steel parts according to the first embodiment.
Figure 19:
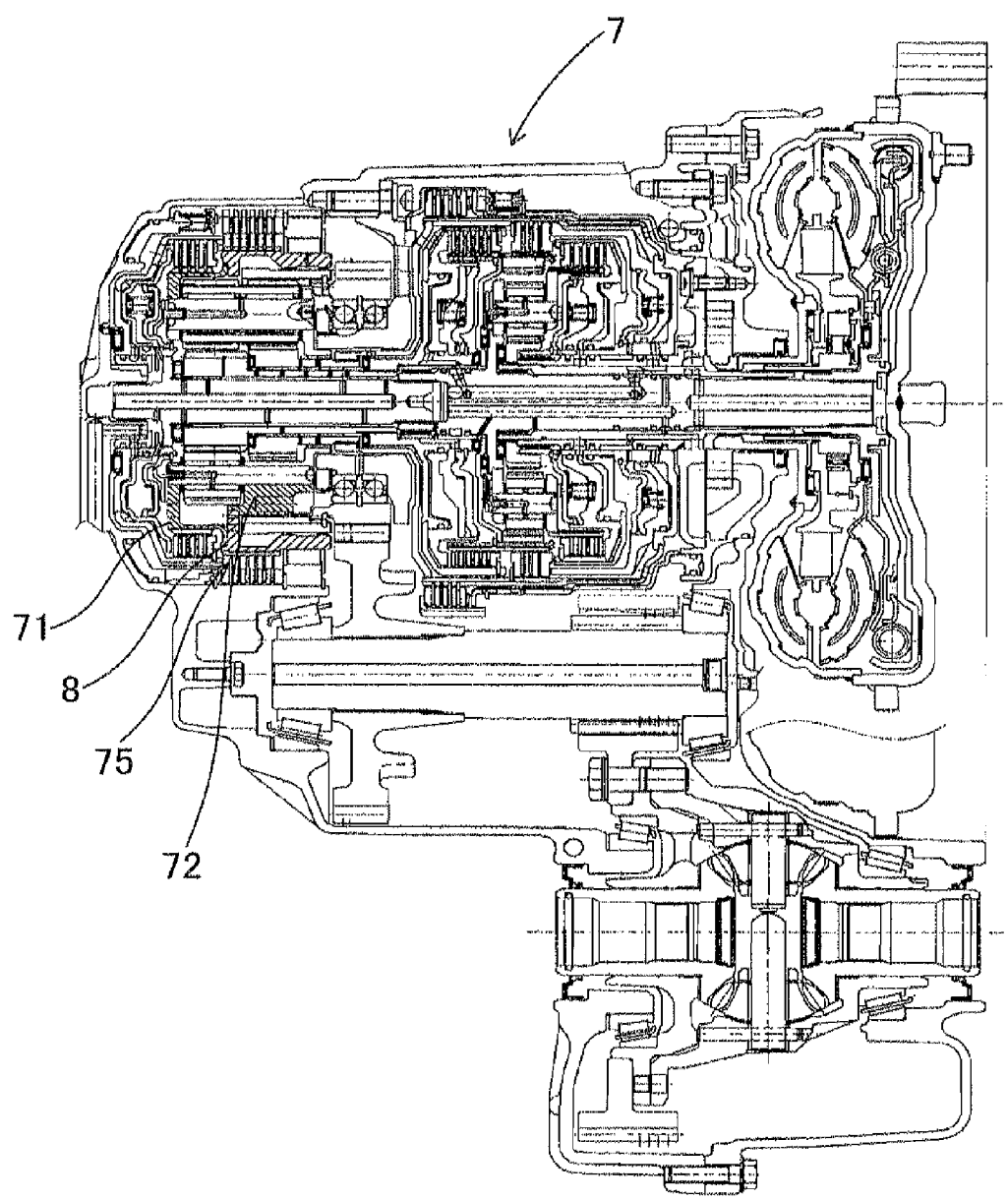
FIG. 19 is an illustration showing the configuration of an assembled part incorporating a composite steel part formed by welding the first steel part and the second and third steel parts to each other according to the first embodiment.

As shown in FIG. 18, two welded portions 750a and 750b of a composite steel part 75 fabricated from the first steel part 8 and the second and third steel parts 71 and 72 each include a melt/resolidificated portion 751 and a heat-affected portion 752 provided adjacent to the melt/resolidificated portion 751. The melt/resolidificated portion 751 has a martensite-bainite-pearlite structure MBP, that is, a structure in which a martensite structure, a bainite structure, and a pearlite structure are mixed with each other. Meanwhile, the heat-affected portion 752 has a bainite-ferrite-pearlite structure, that is, a structure in which a bainite structure, a ferrite structure, and a pearlite structure are mixed with each other. A portion surrounding the heat-affected portion 752 has a ferrite-pearlite structure FP as with the original welding expected portion 825. The remaining portion of the steel part 8 is not changed in structure from what it was before the welding step. A portion of the second and third steel parts 71 and 72 surrounding the welded portions 750a and 750b has a ferrite-pearlite structure FR FIG. 18 shows an assembled part 7 incorporating the composite steel part 75 formed by coupling the second and third steel parts 71 and 72 and the first steel part 8 to each other via the welded portions 750a and 750b. The assembled part 7 is an automotive automatic transmission. The first steel part 8 is an inner race part for a one-way clutch in the assembled part 7. Excellent wear resistance is required for the race portion 81, and excellent weldability with the second and third steel parts 71 and 72 is desired for the welding expected portion 825. Here, the second and third steel parts 71 and 72 form a carrier of a planetary gear mechanism in the assembled part 7, and support pinion gears that mesh with a sun gear and a ring gear of the planetary gear mechanism. For such usage, the composite steel part 75 formed by welding the first steel part 8 according to the above embodiment and the second and third steel parts 71 and 72 to each other sufficiently provides required qualities, and demonstrates excellent performance.

What is claimed is:

1. A manufacturing method for a composite steel part formed by welding a plurality of steel parts to each other, comprising:

manufacturing a first steel part, which includes a carburized quenched portion which has been subjected to a carburizing quenching hardening process and a welding expected portion to be welded to at least a second steel part, by preparing an intermediate product in which an extra portion, which has a thickness equal to or more than that of a carburized layer to be formed in a subsequent carburizing step, has been added to the welding expected portion, and performing the carburizing step in which the intermediate product is heated to an austenitizing temperature or more in a carburizing atmosphere to form the carburized layer on a surface of the intermediate product, a cooling step, subsequent to the carburizing step, in which the intermediate product is cooled at a cooling rate less than a cooling rate at which martensitic transformation is caused and in which the intermediate product is cooled to a temperature equal to or less than a temperature at which structure transformation due to the cooling is completed, a quenching step in which a desired portion of the intermediate product is heated to an austenitizing range by high-frequency heating and thereafter cooled at a cooling rate equal to or more than the cooling rate at which martensitic transformation is caused to form the carburized quenched portion in the desired portion, and a cutting step in which the extra portion of the intermediate product is cut; and then performing a welding step in which at least the second steel part is brought into abutment with the welding expected portion of the obtained first steel part to weld the first steel part and the second steel part to each other.

2. The manufacturing method for a composite steel part according to claim 1, wherein
the first steel part includes a race portion formed in a cylindrical shape and including a sliding surface on its outer peripheral surface or inner peripheral surface, and a coupling portion provided to extend from the race portion to be coupled to at least the second steel part, the race portion being formed by the carburized quenched portion and the coupling portion being provided with the welding expected portion.

3. The manufacturing method for a composite steel part according to claim 2, wherein
the coupling portion includes a splined portion provided to extend from the race portion, and the welding expected portion provided to extend from the splined portion, the splined portion being not subjected to the quenching step.

4. A composite steel part formed by welding a plurality of steel parts to each other, wherein:
the first steel part includes a race portion formed in a cylindrical shape and including a sliding surface on an outer peripheral surface or inner peripheral surface of the race portion, and a coupling portion provided to extend from the race portion to be coupled to at least a second steel part;
the race portion is formed by a carburized quenched portion in which a surface layer portion has a martensite structure and an inner portion has a bainite structure;
the coupling portion includes a welded portion welded to at least the second steel part;
the welded portion includes a melt/resolidificated portion and a heat-affected portion provided adjacent to the melt/resolidificated portion; and
the melt/resolidificated portion has a martensite-bainite-pearlite structure, and the heat-affected portion has a bainite-ferrite-pearlite structure.

5. The composite steel part according to claim 4, wherein
the coupling portion of the first steel part includes a splined portion provided to extend from the race portion, and the welded portion provided to extend from the splined portion, the splined portion having a ferrite-pearlite structure.

* * * * *